United States Patent

Claar et al.

[11] Patent Number: 5,891,960
[45] Date of Patent: Apr. 6, 1999

[54] COATING COMPOSITIONS WITH CITRIC ACID CONTAINING POLYMERS FOR ENHANCED ADHESION TO SUBSTRATES

[75] Inventors: James A. Claar, Washington Township, Westmoveland County; Karl F. Schimmel, Verona; Shanti Swarup, Hampton Township, Allegheny County; Bruce A. Connelly, West Deer Township, Allegheny County, all of Pa.

[73] Assignee: PPG Industries, Inc., Pittsburgh, Pa.

[21] Appl. No.: 928,533

[22] Filed: Sep. 12, 1997

Related U.S. Application Data

[63] Continuation of Ser. No. 720,937, Oct. 4, 1996, abandoned.

[51] Int. Cl.⁶ .................. C08F 8/14; C08F 8/30; C09D 133/14; C09D 163/00
[52] U.S. Cl. .................. 525/162; 525/384; 525/374; 525/401; 525/408; 525/437; 526/320; 528/296; 528/365; 528/366; 528/406; 528/418; 528/419; 528/421; 528/425
[58] Field of Search .................. 525/162, 384, 525/374, 401, 408, 437; 526/320; 528/272, 296, 365, 366, 406, 418, 419, 421, 425

[56] References Cited

U.S. PATENT DOCUMENTS

| | | | |
|---|---|---|---|
| 3,306,883 | 2/1967 | Ravve et al. | 525/384 |
| 3,819,562 | 6/1974 | Cargagna | 524/158 |
| 3,922,253 | 11/1975 | Jerabek et al. | 528/45 |
| 4,001,156 | 1/1977 | Bosso et al. | 523/421 |
| 4,031,050 | 6/1977 | Jerabek | 523/415 |
| 4,148,772 | 4/1979 | Marchetti et al. | 523/415 |
| 4,324,715 | 4/1982 | Emerick | 523/400 |
| 4,468,307 | 8/1984 | Wismer et al. | 428/418 |
| 4,711,917 | 12/1987 | McCollum et al. | 523/400 |
| 4,931,157 | 6/1990 | Valko et al. | 204/505 |
| 4,931,509 | 6/1990 | Yagishita et al. | 525/208 |
| 5,306,567 | 4/1994 | Kuo et al. | 428/482 |
| 5,498,685 | 3/1996 | Carlson et al. | 528/71 |

FOREIGN PATENT DOCUMENTS

| | | |
|---|---|---|
| 63030569 | 9/1988 | Japan . |
| 711592 | 7/1954 | United Kingdom . |

*Primary Examiner*—D. S. Nakarani
*Attorney, Agent, or Firm*—William J. Uhl

[57] ABSTRACT

Coating compositions comprised of a film forming polymer which is the reaction product of (a) a compound containing pendant and/or terminal hydroxyl or epoxy functional groups and (b) citric acid or citric acid anhydride. The coating compositions have enhanced adhesion to galvanized and galvanealed steel substrates without the use of a chrome containing wash primer.

11 Claims, No Drawings

COATING COMPOSITIONS WITH CITRIC ACID CONTAINING POLYMERS FOR ENHANCED ADHESION TO SUBSTRATES

This application is a continuation of application Ser. No. 08/720,937 filed Oct. 4, 1996 which application is now: abandoned.

BACKGROUND OF THE INVENTION

The present invention relates to curable coating compositions, and more particularly to low or ambient temperature curable coating compositions.

In the area of automotive refinish, repairing a defect in the original coating can involve sanding or grinding out the defect by mechanical means, or completely stripping the whole part or the whole vehicle of its original coating layers. This sanding or grinding process typically results in the exposure of bare metal which is then coated with a coating composition, usually a primer composition.

The automotive industry has, from the mid 1980's, been producing automobiles in which the major body panels are made of steel which has an outer surface treated with a zinc containing material. Typically the steel used is galvanized or galvanealed steel. Adhesion of coating compositions to these zinc coated steels may be poor. In some situations, chrome containing wash primers are used prior to the primer application to try to improve adhesion to these substrates. This incorporates an added step in the painting-process and utilizes chrome containing coatings which are not environmentally desirable. It would thus be desirable to have coating compositions that exhibit enhanced adhesion to substrates such as galvanized and galvanealed steel and would eliminate the need for chrome containing wash primers.

SUMMARY OF THE INVENTION

In accordance with the present invention, there is provided a curable coating composition that has enhanced adhesion to galvanized and galvanealed steel substrates without the use of a chrome containing wash primer. The coating composition is comprised of a film forming polymer which is the reaction product of (a) a polymer or compound containing pendant and/or terminal hydroxyl or epoxy functional groups and (b) citric acid or citric acid anhydride.

In one preferred embodiment of the invention, citric acid is reacted with a polymer containing pendant and/or terminal epoxide groups. In another preferred embodiment, the anhydride of citric acid is reacted with a polymer containing pendant and/or terminal hydroxyl groups.

DETAILED DESCRIPTION OF THE INVENTION

The coating compositions of the present invention comprise polymers that are reacted with either citric acid or the anhydride of citric acid to achieve improved adhesion to various metal substrates, including galvanized or galvanealed steel substrates.

Citric acid anhydride may be produced by any of the methods known in the art. For example, citric acid can be reacted with acetic anhydride in the presence of a mineral acid catalyst such as phosphoric acid or sulfuric acid, preferably phosphoric acid, at temperatures ranging from 55° to 100° C. Typically the mole ratio of citric acid to acetic anhydride is about 3:1 to 5:1, preferably from about 3:1 to 4:1. The acetic acid formed in the reaction and any residual acetic anhydride can then be removed by distillation under a vacuum.

Polymers that are reacted with citric acid or citric acid anhydride in the practice of the present invention contain either pendant and/or terminal epoxy groups or pendant and/or terminal hydroxyl groups. Polymers containing epoxy groups may include polyepoxides.

The polyepoxides used in the practice of the present invention may be saturated or unsaturated, cyclic or acyclic, aliphatic, alicyclic, aromatic or heterocyclic as are known to those skilled in the art. Also, the polyepoxides may contain substituents such as halogen, hydroxyl, and ether groups. Examples of polyepoxides are those polymers having a 1,2-epoxy equivalency greater than one and preferably about two, that is, polyepoxides which have on an average basis two epoxy groups per molecule as are well known in the art. Preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis(4-hydroxyphenyl)propane, 1,1-bis(4-hydroxyphenyl)ethane, 2-methyl-1,1-bis(4-hydroxyphenyl)propane, 2,2-bis(4-hydroxy-3-tertiarybutylphenyl)propane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol; 1,4-cyclohexanediol; 1,2-bis (hydroxymethyl)cyclohexane; 1,3-bis(hydroxymethyl) cyclohexane; and hydrogenated bisphenol A.

Further examples of the polyepoxide polymers generally are shown in U.S. Pat. Nos. 4,711,917 (columns 5–8); 4,031,050 (columns 3–5); and 3,922,253 (columns 1–2). The epoxide equivalent weight of the polyepoxide will generally range from 100 to about 2000 and preferably from about 180 to 500. Epoxy group-containing acrylic polymers such as those described in U.S. Pat. No. 4,001,156 (columns 3–6) can also be used.

Chain-extended polyepoxide polymers may also be used and are preferred. Generally, chain extension can be carried out by reacting together a polyepoxide and a polyhydroxyl group-containing material selected from alcoholic hydroxyl group-containing materials and phenolic hydroxyl group-containing materials to chain extend or build the molecular weight of the polyepoxide. A chain-extended polyepoxide may be prepared by any method known to those skilled in the art and is typically prepared by reacting together the polyepoxide and polyhydroxyl group-containing material neat or in the presence of an organic solvent such as a ketone, including methyl isobutyl ketone and methyl amyl ketone, aromatics such as toluene and xylene, and glycol ethers such as the dimethyl ether of diethylene glycol and the momomethyl ether of propylene glycol. The reaction is usually conducted at a temperature of about 80° C. to 160° C. for about 30 to 180 minutes until an epoxy group-containing resinous reaction product is obtained. The equivalent ratio of reactants, i.e., epoxy:polyhydroxyl group-containing material is typically from about 1:0.75 to 1:2. These materials and the reactions to produce them are more fully described in U.S. Pat. Nos. 4,148,772 (columns 2–6) and 4,468,307 (columns 2–4), all hereby incorporated by reference for their teachings on chain extension of polyepoxides.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157, all of which are incorporated by reference for these teachings. Examples of phenolic hydroxyl group-containing materials are polyhydric phenols such as bisphenol A, phloroglucinol, catechol, and resorcinol. Mixtures of alcoholic hydroxyl group-containing materials and phenolic hydroxyl group-containing materials may also be used.

Also, the chain extension of the polyepoxides optionally can be with a polycarboxylic acid material, preferably a dicarboxylic acid. Useful dicarboxylic acids include acids having the general formula: HOOC—R—COOH, where R is a divalent moiety that is substantially unreactive with the polyepoxide. R can be a straight chained or a branched alkylene or aLkylidene moiety normally containing from 2 to 42 carbon atoms. Some examples of suitable dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid and the like. It should be understood that dicarboxylic acids of the above general formula where R is a moiety of less than 4 carbon atoms can include, for example, oxalic acid, malonic acid, succinic acid, and glutaric acid, but these acids are less preferred. Additional suitable dicarboxylic acids include substantially saturated acyclic, aliphatic dimer acids formed by the dimerization reaction of fatty acids having from 4 to 22 carbon atoms and a terminal carboxyl group (forming dimer acids having from 8 to 44 carbon atoms). Dimer acids are well known in the art. An example of such a diacid is the so-called "dimer acids" and "trimer acids" sold under the name EMPOL® by the Henkel Corporation, Emery Group, Cincinnati, Ohio. These are produced by the polymerization of fatty acids, and the various EMPOL® products differ from each other in the relative proportions of dimer and trimer acids present, as well as monoacid impurity and amount of residual unsaturation remaining. The dimer acids are $C_{36}$ and the trimer acids are $C_{54}$.

Polymers containing pendant and/or terminal hydroxyl groups may include acrylic polymers or polyester polymers. The acrylic polymers are copolymers of one or more alkyl esters of acrylic acid or methacrylic acid optionally together with one or more other polymerizable ethylenically unsaturated monomers. These polymers may be either of the thermoplastic type or the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate.

Suitable functional monomers used in addition to the other acrylic monomers mentioned above may include, for example, hydroxyethyl acrylate, hydroxyethyl methacrylate, hydroxypropyl acrylate, and hydroxypropyl methacrylate. Also alyl alcohol or oxyalkylated monomers such as oxyalkylated acrylic and methacrylic acid may be used. Additionally, polyhydroxy acrylates chain extended with caprolactone may also be used.

In addition to a method of reacting the citric acid anhydride with an acrylic polymer having pendant and/or terminal hydroxyl groups, a citric acid anhydride adduct can first be formed by reacting the citric acid anhydride with one of the hydroxyl group containing monomers of the acrylic polymer, and then forming the citric acid modified acrylic polymer by reacting the adduct with other monomers such as those described above.

Besides acrylic polymers, the hydroxyl containing polymer can be a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

In one preferred embodiment citric acid may be reacted with a polymer containing terminal and/or pendant epoxy groups in an amount ranging from about 5 to 15 weight percent, preferably from about 7 to 10 weight percent based on total resin solids. The reaction times and temperatures may be those that are known in the art for such reactions. Suitable reaction conditions may be, for example, at temperatures ranging from about 60° to 150° C., preferably from about 80° to 120° C. for about 1 hour to 8 hours.

In another preferred embodiment citric acid anhydride is reacted with a polymer containing pendant and/or terminal hydroxyl groups in an amount ranging from about 5 to 50 weight percent, preferably from about 10 to 30 weight percent based on total resin solids. The reaction times and temperatures may be those that are known in the art for such reactions. Suitable reaction conditions may be, for example, at temperatures ranging from about 60° to 150° C., preferably from about 80° to 90° C. for about 1 hour to 8 hours.

The coating composition may contain a crosslinking agent to facilitate cure of the coating. Useful crosslinking agents include polyisocyanates and aminoplasts. Some useful polyisocyanates include aromatic and aliphatic polyisocyanates, including cycloaliphatic polyisocyanates. Suitable examples include diphenylmethane-4,4'-diisocyanate, 2,4- or 2,6-toluene diisocyanate, including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanates are commercially available from Bayer USA, Inc. under the trademarks MONDUR and DESMODUR.

Aminoplast resins are condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Preferably, these methylol groups are etherified by reaction with an alcohol. Various alcohols employed include monohydric alcohols containing from 1 to 4 carbon atoms such as methanol, ethanol, isopropanol, and n-butanol, with methanol being preferred. Aminoplast resins are commercially available from CYTEK Industries, Inc. under the trademark CYMEL® and from Monsanto Chemical Co. under the trademark RESIMENE®.

The coating composition of the present invention may also contain a number of optional conventional ingredients such as pigments, rheology control agents, flow control agents, corrosion inhibitive pigments, adhesion promoters, catalysts, cure retarders, and fillers. A solvent or a blend of solvents is generally utilized to reduce the coating composition to an optimum spray viscosity. Examples of suitable reducing solvents include acetone, methyl ethyl ketone, methyl isobutyl ketone, methyl amyl ketone, and butyl acetate. Preferably, a blend of solvents is used.

The coating compositions of the present invention are generally solvent based, but they may also be water based. An amine may be used to neutralize the carboxyl groups of the attached citric acid or citric acid anhydride to form an emulsion of the polymer in water. Useful amines include dialkanolamines, alkylalkanolamines, and arylalkanolamines containing from 2 to 18 carbon atoms in the alkanol, alkyl, and aryl chains. Specific examples include N-ethylethanolamine, N-methylethanolamine, diethanolamine, N-phenylethanolamine and diisopropanolamine.

Amines which do not contain hydroxyl groups can also be used such as diamines and mixed alkyl-aryl amines and substituted amines in which the substituents are other than hydroxyl can also be used. Specific examples of these amines are methylethylamine, 2-methylpropylamine, diethylamine, dipropylamine, dibutylamine, dicocoamine, diphenylamine, N-methylaniline, diisopropylamine, methylphenylamine and dicyclohexylamine. Also, amines with ring structures such as morpholine, piperidine, N-methylpiperazine and N-hydroxyethylpiperazine can be used. Ammonia can also be used and is considered for the purposes of this application to be an amine.

The coating compositions of the present invention can be applied to a variety of substrates by any of the conventional coating application techniques such as brushing, spraying, dipping, or flow coating, but it is preferred that spray application be used since this generally provides optimum appearance. Any of the known spray techniques may be employed such as compressed air spraying and airless spraying, including manual and automatic methods. Also electrostatic spray techniques may be used. The coating composition is typically applied such that the dry film thickness of the coating is in the range of about 15 to 200 microns.

The coating compositions may be cured, preferably at ambient temperature, or at elevated temperatures ranging from about 40° to 170° C. for about 10 to 60 minutes. Essentially complete cure can generally be achieved in about three to four hours at ambient conditions. For purposes of this invention, essentially complete cure is intended to mean the attainment of satisfactory performance properties even though the crosslinking reaction may not have reached completion.

The coating compositions of the present invention are particularly advantageous as primer coating compositions for automotive refinish applications. The compositions can be applied directly to bare metal surfaces and, after being allowed to cure and the finish prepared such as by sanding, coated directly with a pigmented topcoat composition or "color plus clear" topcoat system. The coating compositions of this invention may also be used as a pigmented topcoat composition or as the pigmented basecoat composition and/or clear topcoat composition in a "color plus clear" system.

The invention will further be described by reference to the following examples which are presented for the purpose of illustration only and are not intended to limit the scope of the invention.

EXAMPLES

Example A shows the preparation of a citric acid anhydride/hydroxyethyl methacrylate adduct that is used in the preparation of a citric acid modified acrylic polymer described in Example B. Example C shows the preparation of a polyepoxide polymer modified with citric acid. Example D shows the preparation of a citric acid modified acrylic-polyester polymer.

Example A
(Preparation of a citric acid anhydride/hydroxyethyl methacrylate adduct.)

A citric acid anhydride/hydroxyethyl methacrylate adduct to be used in the preparation of a citric acid modified polymer of the present invention was prepared by adding to a suitably equipped reaction flask, 1.5 moles of citric acid, 5.27 moles of acetic anhydride and one drop of 85% phosphoric acid. The mixture was stirred with a light nitrogen sparge while heating to 55° C. at which point an exotherm occurred, reaching a maximum temperature of 75° C. The nitrogen sparge was reduced to a light bubble and the pressure was reduced in the flask by the use of an aspirator to 200±20 mm of mercury, and acetic acid was removed at 75° C. The solution was then cooled to 30° C. and then the vacuum was released with nitrogen and the distillate removed. The pressure was then reduced to 100 mm and the solution was heated to 85° C. to distill off residual acetic anhydride. The vacuum was broken with nitrogen and the solution was then cooled to 75° C. Hydroxyethyl methacrylate (2 moles) was then added in an air atmosphere (no nitrogen present) and an exotherm to 89° C. occurred. The reaction product was then cooled to ambient temperature. The adduct had an acid value of 300, a Gardner Holt Viscosity of G and a solids content of 53.1 percent by weight.

Example B
(A citric acid modified acrylic polymer of the present invention)

A citric acid modified acrylic polymer of the present invention was prepared as follows. In a suitable reaction flask equipped with a stirrer, thermometer, addition funnels and a full return condenser, 185 grams of propylene glycol monomethyl ether acetate (DOWANOL® PM Acetate available from Dow Chemical) was heated to 90° C. under a nitrogen atmosphere. The temperature was maintained at 90°±2° C. during the reaction. Next an initiator mixture consisting of 76 grams of DOWANOL® PM Acetate and 30 grams of t-amyl peroxy-2-ethylhexoate (LUPERSOL® 575 available from Elf Atochem North America, Inc.) was added over 2 hours. A monomer mixture consisting of 20 grams of styrene, 100 grams of n-butyl methacrylate, and 80 grams of the citric acid anhydride adduct of Example A was added over 1.5 hours with the addition of the monomer mixture starting 10 minutes after the start of the initiator addition. After the additions were complete, the mixture was held at 90° C. for 2 hours. The reaction flask was then reconfigured for distillation and a nitrogen sparge was introduced into the polymer solution while the solution was heated to 140° C. and until a Gardner Holt Viscosity of X to Y was achieved. The resulting polymer had a solids content of 63.5 percent by weight.

Example C
(A polyepoxide polymer modified with citric acid of the present invention)

A chain extended polyepoxide polymer was prepared by adding to a suitably equipped reaction flask, 1.06 moles of EMPOL 1008® (a dimer acid containing 94% of $C_{36}$ dibasic acid, 3% of $C_{54}$ polybasic acid and 3% monobasic acid having a molecular weight of about 590 commercially available from Henkel Corporation), 1.55 moles of EPON® 828 (polyglycidyl ether of bisphenol A, commercially available from Shell Oil and Chemical Co.), 166 grams of xylene, 864.9 grams of propylene glycol monomethyl ether (conmnercially available as DOWANOL PM from Dow Chemical Co.) and 14.0 grams of ethyltriphenyl phosphonium iodide. The mixture was stirred with a light nitrogen sparge while heating to 120° C. The mixture was then held at this temperature till the epoxy equivalent weight reached about 2500 and the acid value was below 0.2. To the resultant polyepoxide polymer was added 102.0 grams of citric acid, and the mixture was cooled to 90° C. The mixture was held at this temperature until an acid value in the range of 21–25 was reached. The citric acid modified polymer had a solids content of about 57% by weight.

Example D
(A citric acid modified acrylic-polyester polymer of the present invention)

An acrylic-polyester polymer was prepared by adding to a reaction vessel equipped with a stirrer, condenser, temperature probe and nitrogen inlet, 134.4 grams of a polyester polymer described below, 81.4 grams xylene and 92.0 grams AROMATIC 100 (an aromatic hydrocarbon mixture from Exxon Chemical). The mixture was then heated to reflux, about 145° C. Two feeds, identified herein as A and B, were simultaneously added to the vessel over a period of three hours while the contents of the vessel were maintained at reflux conditions. Feed A consisted of 6.9 grams di-t-butyl peroxide, 90.8 grams xylene and 90.8 grams AROMATIC 100. Feed B consisted of 130 grams styrene, 131.4 grams hydroxyethyl methacrylate, 65.0 grams butyl acrylate and 20.0 grams methyl methacrylate. After the addition of the feeds A and B were complete, the contents of the vessel were allowed to reflux one hour after which a mixture of 1.7 grams di-t-butyl peroxide and 15.6 grams xylene were added to the vessel over a period of 30 minutes followed by reflux for an additional 2 hours. Thereafter, heating was discontinued, 15.6 grams butyl acetate was added to the vessel and the resultant acrylic-polyester polymer was cooled to less than 85° C. Then, 57.2 grams of a 50% solution of citric acid anhydride in butyl acetate was added to the vessel over 30 minutes. The vessel contents were stirred at 80° C. until infrared analysis showed no evidence of anhydride. The resulting citric acid modified acrylic-polyester polymer had a total solids content measured at 110° C. for one hour of 52.8 percent by weight, a Gardner viscosity of Z1-, an acid value of 14.6, an hydroxyl number of 74, a number average molecular weight of 2675 and a weight average molecular weight of 57,649 as determined by gel permeation chromatography utilizing a polystyrene standard.

The polyester polymer used in this example was prepared by heating a mixture of 2.3 grams triphenyl phosphite, 1.5 grams dibutyltin oxide, 362.7 grams (2.36 moles) hexahydrophthalic anhydride, 489.7 grams (1.80 moles) Emery 422 stearic acid, 561.9 grams (4.19 moles) trimethylolpropane and 42.4 grams xylene to reflux. Water was azeotropically removed and the condensation reaction was continued until the acid value was less than 1 mg KOH/gram. The resulting product had a total solids content measured at 110° C. for one hour of 93% by weight, a Brookfield viscosity of 46,900 centipoise measured at 12 rpm using a number 5 spindle and a hydroxyl value of 233.8 mg KOH/gram.

Example 1

An automotive refinish primer composition of the present invention was prepared from the citric acid modified acrylic polymer of Example B and the following ingredients:

| Ingredients | Parts by Weight |
|---|---|
| Grind Paste: | |
| ANTI-TERRA-U[1] | 0.76 |
| MPA 2000T[2] | 1.01 |
| Acrylic polyol[3] | 9.74 |
| Chlorinated polyolefin[4] | 1.2 |
| Methyl isobutyl ketone | 2.95 |
| Isopropyl alcohol | 0.38 |
| Ketimine resin[5] | 32.24 |
| Talc[6] | 7.55 |
| Titanium dioxide[7] | 10.96 |
| Barytes[8] | 13.64 |
| Magnesium aluminum silicate[9] | 0.98 |
| Silicon dioxide[10] | 0.36 |
| Carbon black[11] | 0.09 |
| Resin: | |
| Citric acid anhydride modified acrylic polymer of Example B | 33.72 |
| Methyl amyl ketone | 39.67 |
| DESMODUR N 3400[12] | 44.74 |

[1]Pigment wetting agent (salt of polyamid acid ester) commercially available from BYK-Chemie USA.
[2]Wax anti-settling agent commercially available from Rheox.
[3]Acrylic polyol containing 77 weight percent butyl acrylate, 21 weight percent hydroxyethyl acrylate, and 2 weight percent butyl methacrylate.
[4]Commercially available from Eastman Chemical as CP-343-1.
[5]Ketimine resin solution which is the reaction product of 33 weight percent isophorone diamine and 67 weight percent methyl isobutyl ketone.
[6]Commercially available from Barrets Minerals as MP 15-38.
[7]Commercially available from E.I. Du Pont de Nemours and Co. as R902.
[8]Commercially available from Mountain Minerals as W-10.
[9]Commercially available from Engelhard Industries, Inc. as ATTAGEL 50.
[10]Fumed silica commercially available from PPG Industries, Inc. as LOVEL® 27.
[11]Commercially available from Phelps Dodge, Inc. as RAVEN® 410.
[12]Polyisocyanate commercially available from BAYER USA.

The grind paste was prepared by combining the ingredients in a suitable vessel under high speed agitation using a Cowles blade. Agitation was continued at high speed for 30 minutes until a Hegman grind of 5 to 5.5 was obtained. Next the citric acid modified polymer of Example B and the methyl amyl ketone were added and mixed with the grind paste under agitation. The DESMODUR N 3400 was added just prior to spray application.

Example 2

An automotive refinish primer composition of the present invention was prepared from the citric acid modified polyepoxide polymer of Example C and the following ingredients:

| Ingredients | Parts by Weight |
| --- | --- |
| Grind Paste: | |
| CETALUX C1152[1] | 15.39 |
| BENTONE 38[2] | 0.65 |
| Nitrocellulose[3] | 1.01 |
| Epoxy resin[4] | 1.17 |
| Carbon black | 0.08 |
| Talc | 18.96 |
| Barytes | 19.45 |
| Titanium dioxide | 22.18 |
| Xylene | 14.9 |
| AROMATIC 100[5] | 10.3 |
| n-Butyl acetate | 17.81 |
| Resin: | |
| DT-870[6] | 41.4 |
| Citric acid modified polyepoxide polymer of Example C | 30.0 |
| DESMODUR N 3400 | 44.74 |

[1]Polyester resin commercially available from Kunstharsfabriek Synthese.
[2]Rheology modifier commercially available from Rheox, Inc.
[3]Nitrocellulose resin solution #2075, commercially available from Akzo Coatings, Inc.
[4]Epichlorohydrin / bisphenol A epoxy resin commercially available from Dow Corning, Inc. as DER 671-T75.
[5]Acetate ester solvent blend commercially available from Exxon Chemicals, Inc.
[6]DT-870 is a mid-temperature solvent reducer blend commercially available from PPG Industries, Inc.

The grind paste was prepared by combining the ingredients in a suitable vessel under high speed agitation using a Cowles blade. Agitation was continued at high speed for 30 minutes until a Hegman grind of 5 to 5.5 was obtained. Next the citric acid modified polymer of Example C and the DT-870 solvent blend were added and mixed with the grind paste under agitation. The DESMODUR N 3400 was added just prior to spray application.

The primer composition of this example was tested by spray applying the primer to test panels (cold rolled steel, electrogalvanized steel, and galvanealed steel), topcoating with a colorcoat, and then evaluating the coated test panels for cross hatch adhesion and humidity blister resistance. One test panel of each type of steel was sanded with 180 grit sandpaper prior to primer application and another test panel was not sanded. All test panels were solvent wiped with DX-330, an aliphatic solvent blend containing oleic acid commercially available from PPG Industries, Inc., after sanding and prior to primer application. The primer composition of this example was spray applied to each test panel to a dry film thickness of 1.5 to 2.0 mils (38 to 51 $\mu$). After application to the test panels, the primer was cured for 30 to 60 minutes at ambient temperature. The panels were then topcoated with DCC-9300/DU-5 CONCEPT® Colorcoat commercially available from PPG Industries, Inc. to a film thickness of 1.0 to 2.0 mils (25 to 51 $\mu$). The panels were then allowed to cure for 24 hours at ambient temperature prior to testing. Two sets of control (comparative) panels were also prepared. One set used an automotive refinish primer commercially available from PPG Industries, Inc. as K-36, and the other comparative set of panels were first coated with a chrome wash primer commercially available from PPG Industries, Inc. as DP-1791 and then coated with K-36 refinish primer prior to topcoating as described above.

Crosshatch adhesion was measured according to ASTM D3359 before and after 96 hours of humidity exposure (100° F. and 100% relative humidity) whereby the coating was scribed with eleven parallel cuts through the film 1 millimeter apart, using a Gardner Cross Cut Tester Model P-A-T, fitted with a PA-2056 blade (both available from Gardco, Pompano Beach, Fla.). Eleven similar cuts were made at 90 degrees to and crossing the first eleven cuts. Permacel 99 tape was applied over the area of cuts by pressing down firmly against the coating to eliminate voids and air pockets. Then the tape was sharply pulled off at a 180 degree angle to the plane of the coated surface. Adhesion was rated on a graduated scale of 0 to 5 with 0 representing complete loss of adhesion and 5 representing no loss of adhesion. The test panels were also evaluated for blistering after the 96 hours of humidity exposure. The results are listed in Table I below.

TABLE I

| Primer | Substrate | Sand | Pencil Hardness | Adhesion* Dry | Adhesion* Humidity | Humidity** Blistering |
| --- | --- | --- | --- | --- | --- | --- |
| K36 | Cold Rolled | Y | F | 5 | 5 | None |
| K36 | Cold Rolled | N | F– | 4– | 0 | #4 Med Dense |
| K36 | Electrogalvanized | Y | F | 5 | 0 | #8 Few |
| K36 | Electrogalvanized | N | B | 0 | 0 | #6 Med Dense |
| K36 | Galvanealed | Y | B | 0 | 0 | None |
| K36 | Galvanealed | N | HB | 5 | 0 | #8 Few |
| DP1791/K36 | Cold Rolled | Y | F | 5 | 5 | None |
| DP1791/K36 | Cold Rolled | N | F | 5 | 5 | None |
| DP1791/K36 | Electrogalvanized | Y | F | 5 | 5 | None |
| DP1791/K36 | Electrogalvanized | N | F | 5 | 5 | None |
| DP1791/K36 | Galvanealed | Y | HB | 5 | 5 | None |
| DP1791/K36 | Galvanealed | N | HB | 5 | 5 | None |
| Example 2 | Cold Rolled | Y | F | 5 | 0 | None |
| Example 2 | Cold Rolled | N | F | 5 | 0 | None |
| Example 2 | Electrogalvanized | S | F | 5 | 5 | #8 Few |
| Example 2 | Electrogalvanized | N | F | 5 | 5 | #8 Few |
| Example 2 | Galvanealed | Y | F | 5 | 5 | None |
| Example 2 | Galvanealed | N | F | 5 | 5 | #8 Few |

*Adhesion was rated on a graduated scale of 0 to 5 with 0 representing complete loss of adhesion and 5 representing no loss of adhesion.
**Humidity blistering was rated on a graduated scale and indicates the size of the blisters, with #1 representing very large blisters and #10 representing very small blisters.

Example 3

An automotive refinish primer composition of the present invention was prepared from the citric acid modified acrylic-polyester polymer of Example D and the following ingredients:

| Ingredients | Parts by Weight |
| --- | --- |
| Grind Paste: | |
| SETALUX C1152 | 15.39 |
| BENTONE 38 | 0.65 |
| Nitrocellulose | 1.01 |
| Epoxy resin | 1.17 |
| Carbon black | 0.08 |
| Talc | 18.96 |
| Barytes | 19.45 |
| Titanium dioxide | 22.18 |
| Xylene | 14.9 |
| AROMATIC 100 | 10.3 |
| n-Butyl acetate | 17.81 |
| Resin: | |
| DT-870 | 41.4 |
| Citric acid modified polyepoxide polymer of Example D | 33.92 |
| DESMODUR N 3400 | 44.74 |

The grind paste was prepared by combining the ingredients in a suitable vessel under high speed agitation using a Cowles blade. Agitation was continued at high speed for 30 minutes until a Hegman grind of 5 to 5.5 was obtained. Next the citric acid modified polymer of Example D and the DT-870 solvent blend were added and mixed with the grind paste under agitation. The DESMODUR N 3400 was added just prior to spray application.

The primer composition of this example was sprayed onto cold rolled steel and electrogalvanized test panels and tested as described above in Example 2. The test results are listed below in Table II.

TABLE II

| Primer | Substrate | Sand | Pencil Hardness | Adhesion Dry | Adhesion Humidity | Humidity Blistering |
| --- | --- | --- | --- | --- | --- | --- |
| K36 | Cold Rolled | Y | F | 5 | 4 | Microblisters |
| K36 | Cold Rolled | N | F– | 3+ | 0 | Microblisters |
| K36 | Electrogalvanized | Y | F | 5 | 0 | Denseblisters |
| K36 | Electrogalvanized | N | B | 5 | 0 | Denseblisters |
| DP1791/K36 | Cold Rolled | Y | H | 5 | 4+ | None |
| DP1791/K36 | Cold Rolled | N | H | 5 | 4+ | None |
| DP1791/K36 | Electrogalvanized | Y | H | 5 | 5 | None |
| DP1791/K36 | Electrogalvanized | N | H | 5 | 5 | None |
| Example 3 | Cold Rolled | Y | HB | 5 | 3+ | None |
| Example 3 | Cold Rolled | N | HB | 5 | 5 | None |
| Example 3 | Electrogalvanized | S | HB | 5 | 5 | None |
| Example 3 | Electrogalvanized | N | HB | 5 | 5 | None |

The data listed in Tables I and II show that the primer compositions of the present invention are superior to commercial refinish primers and may allow for the elimination of a processing step when a commercial chrome wash primer was used. The data show that the primer compositions of the present invention have approximately equal adhesion to galvanized steel and galvanealed steel as the commercial chrome wash primer system.

What is claimed is:

1. A solvent-based curable coating composition comprising a carboxyl functional polymer or compound comprising the reaction product of the following components:
   (a) a polymer or compound selected from the group consisting of
      (i) an acrylic polymer containing pendant and/or terminal hydroxyl or epoxy functional groups;
      (ii) a polyester polymer containing pendant and/or terminal hydroxyl or epoxy functional groups;
      (iii) a polyglycidyl ether of a cyclic polyol containing pendant and/or terminal epoxy functional groups; and
      (iv) an acrylic monomer containing pendant and/or terminal hydroxyl groups; and
   b) a material selected from the group consisting of citric acid anhydride and citric acid,
   wherein the carboxyl functionality of the polymer or compound is in a terminal and/or pendant position and is derived from the reaction of the hydroxyl functional groups with citric acid anhydride and/or the reaction of the epoxy functional groups with citric acid, and when component (a) is the acrylic monomer (iv) which has been reacted with component (b) to form a carboxyl functional adduct, the adduct being further reacted under free radical initiated polymerization conditions with at least one other ethylenically unsaturated monomer to form the carboxyl functional polymer.

2. The coating composition of claim 1 wherein component (a) contains at least one epoxy functional group and component (b) is citric acid.

3. The coating composition of claim 2 wherein the polymer or compound is the reaction product of component (a) and 5 to 15 weight percent of citric acid based on total weight of (a) and (b).

4. The coating composition of claim 2 wherein the polymer or compound is the reaction product of component (a) and 7 to 10 weight percent of citric acid based on total weight of (a) and (b).

5. The coating composition of claim 1 wherein component (a) contains at least one hydroxyl functional group and component (b) is citric acid anhydride.

6. The coating composition of claim 5 wherein the polymer or compound is the reaction product of component (a) and 5 to 50 weight percent of citric acid anhydride based on total weight of (a) and (b).

7. The coating composition of claim 5 wherein the polymer or compound is the reaction product of component (a)

and 10 to 30 weight percent of citric acid anhydride based on total weight of (a) and (b).

8. The coating composition of claim 1 further comprising a curing agent selected from the group consisting of polyisocyanates and aminoplasts.

9. The coating composition of claim 8 further comprising at least one pigment.

10. The coating composition of claim 1 further comprising at least one pigment.

11. A curable coating composition comprising a carboxyl functional polymer or compound comprising the reaction product of the following components:

(a) a polymer or compound selected from the group consisting of
  (i) an acrylic polymer containing pendant and/or terminal hydroxyl or epoxy functional groups;
  (ii) a polyglycidyl ether of a cyclic polyol containing pendant and/or terminal epoxy functional groups; and
  (iii) an acrylic monomer containing pendant and/or terminal hydroxyl groups; and (b) a material selected from the group consisting of citric acid anhydride and citric acid, wherein the carboxyl functionality of the polymer or compound is in a terminal and/or pendant position and is derived from the reaction of the hydroxyl functional groups with citric acid anhydride and/or the reaction of the epoxy functional groups with citric acid, and when component (a) is the acrylic monomer (iii) which has been reacted with component (b) to form a carboxyl functional adduct, the adduct being further reacted under free radical initiated polymerization conditions with at least one other ethylenically unsaturated monomer to form the carboxyl functional polymer.

* * * * *